3,058,960
COPOLYMERS OF 1,1,2,3-TETRACHLORO-BUTADIENE-1,3

Clare A. Stewart, Jr., Wilmington, Del., assignor to E. I. du Pont de Nemours and Company, Wilmington, Del., a corporation of Delaware
No Drawing. Filed Feb. 17, 1960, Ser. No. 9,198
3 Claims. (Cl. 260—87.5)

This invention is directed to copolymers of 1,1,2,3-tetrachlorobutadiene-1,3 with other copolymerizable compounds containing the terminal grouping $CH_2=C<$.

In spite of the large number of polymers which have been described and studied, there is still a need for additional polymeric materials which possess novel or significantly superior properties.

It is, therefore, an object of the present invention to provide new polymeric materials. A more specific object is to provide a novel copolymers of 1,1,2,3-tetrachlorobutadiene-1,3 with other copolymerizable monomers containing ethylenic unsaturation. These and other objects will become apparent in the following description and claims.

More specifically, the present invention is directed to copolymers of 1,1,2,3-tetrachlorobutadiene-1,3 with other copolymerizable monomers containing the terminal grouping $CH_2=C<$.

The compound 1,1,2,3-tetrachlorobutadiene may be prepared from 1,1,2,2,3,4-hexachlorobutane by any of the methods used for dehydrochlorination of polychlorohydrocarbons. Because of the relatively great stability of the compound, a wide variety of conditions may be used. The general methods used are treatment with a caustic, either solid or dissolved in water or an alcohol. Preferred temperatures for the alcohols are below about 50° C. and for water, below about 100° C.

Polymerization of this diene in bulk, in solution, or in emulsion in the presence of the usual polymerization initiators generally leads to low-molecular-weight oils insoluble in alcohol. In the presence of polymerizable olefinic compounds, however, these conditions for polymerization give solid copolymers of high molecular weight.

Copolymerization may be carried out in bulk, solution, or emulsion by any of the methods commonly used for polymerization. Polymerization may be initiated by the addition of the conventional initiators, such as compounds which generate free radicals. Examples of these are organic and inorganic peroxy compounds and aliphatic azo compounds such as alpha, alpha'-azodiisobutyronitrile. The usual chain-transfer agents, such as aliphatic mercaptans, sulfur, and dialkyl xanthogen disulfides, may be used when control of molecular weight is desired.

Representative suitable monomers for copolymerization with 1,1,2,3-tetrachlorobutadiene-1,3 include:

(a) Vinyl aromatic compounds, such as styrene, the vinyltoluenes and vinylnaphthalenes
(b) Aliphatic conjugated diene compounds, such as butadiene-1,3, isoprene, chloroprene, and 2,3-dichlorobutadiene-1,3
(c) Vinyl ethers, esters, and ketones
(d) Acrylic and methacrylic acid and esters, amides, and nitriles thereof.

Copolymers can be made of 1,1,2,3-tetrachlorobutadiene-1,3 with one or more of these monomeric materials. The 1,1,2,3-tetrachlorobutadiene-1,3 may be present in any proportion, preferably 5 to 75% by weight of the total polymerizable material, according to the particular properties desired.

These novel copolymers of 1,1,2,3-tetrachlorobutadiene-1,3 with chloroprene exhibit the good tensile properties and resistance to oils and solvents of chloroprene polymers and show the added advantage of having a high degree of freeze resistance. This makes them particularly suitable for use in applications where the polymer will be exposed to low temperatures.

The copolymers of 1,1,2,3-tetrachlorobutadiene-1,3 with styrene yield polymers which are suitable for use in molded goods. An example of such a polymer is the copolymer of 50 parts of 1,1,2,3-tetrachlorobutadiene-1,3 with 50 parts of styrene, which yields a polymer from which may be formed molded articles of greater flexibility than those prepared from homopolymers of styrene.

Representative examples illustrating the present invention follow.

PREPARATION OF 1,1,2,3-TETRACHLOROBUTADIENE-1,3; ALL PARTS ARE BY WEIGHT UNLESS OTHERWISE INDICATED

A solution is prepared from 20 gm. (0.30 mole) of solid potassium hydroxide and 150 ml. of methanol. This solution is stirred and maintained at 40° C. while 40 gms. (0.15 mole) of 1,1,2,2,3,4-hexachlorobutane (made by addition of chlorine to monovinylacetylene) is added over a period of about 30 minutes. A portion of the methanol is evaporated under reduced pressure and 250 ml. of water is then added. The organic liquid precipitated is separated and washed with water. After drying over calcium chloride, the material is distilled to yield 24 gm. of the 1,1,2,3-tetrachlorobutadiene, boiling between 65 and 68° C. at 20 mm. pressure. The yield is thus 83% of theory. The diene has a density of 1.468, a refractive index at 25° of 1.5240, and accordingly a molecular refraction of 40.2, as compared with a calculated value of 39.2, the difference indicating that the double bonds are conjugated. The presence of conjugated double bonds is also indicated by the ultraviolet and infrared spectra.

Example 1

COPOLYMER OF 1,1,2,3-TETRACHLOROBUTADIENE-1,3 WITH STYRENE

A mixture of 2.94 g. of 1,1,2,3-tetrachlorobutadiene with 7.22 g. of styrene containing .036 g. benzoyl peroxide was heated for 1 hr. at 80° C. in a water bath. At the end of this time, the polymer formed was isolated by adding 50 ml. of methanol and pouring this mixture into 100 ml. of boiling water to remove methanol and residual monomers. The polymer was purified by dissolving in a minimum amount of hot benzene and reprecipitating with cold methanol to given 0.25 g. of a balata-like product somewhat more resilient and less brittle than polystyrene which contained 25.6% chlorine (34.5% tetrachlorobutadiene).

Example 2

COPOLYMER OF 1,1,2,3-TETRACHLOROBUTADIENE-1,3 WITH CHLOROPRENE (2-CHLOROBUTADIENE-1,3)

An emulsion was prepared by adding a solution of 3 g. of disproportionated rosin and 0.3 of dodecyl mercaptan in 50 g. each of chloroprene and 1,1,2,3-tetrachlorobutadiene-1,3 to a solution of 0.3 g. of sodium sulfite, 0.3 g. of the sodium salt of a condensation product of formaldehyde and naphthalenesulfonic acid, and 0.6 g. of sodium hydroxide in 350 g. water, using vigorous agitation. This emulsion was polymerized at 40° C. from 1.028 to 1.042 specific gravity by the addition of 0.4 g. of cumene hydroperoxide and 1 g. of a 1% sodium hydrosulfite solution. After stripping unconverted monomers at reduced pressure, the polymer was coagulated by the addition of 500 ml. of acetone, 200 ml. of methanol, 50 ml. of benzene, 1 ml. of acetic acid and 10 ml. of 10% calcium chloride solution. The polymer was leached in acetone, dissolved in 150 ml. of hot benzene, reprecipitated with 300 ml. of acetone, leached again, and dried under vacuum. There was obtained 13 g. of soft rubbery polymer containing 45.1% chlorine (15% tetrachlorobutadiene) having a density of 1.27. This polymer exhibited a high degree of freeze resistance. It did not harden during two weeks' exposure to a temperature of −20° C.

*Example 3*

COPOLYMER OF 1,1,2,3-TETRACHLOROBUTADIENE-1,3 WITH CHLOROPRENE

An emulsion was prepared containing the following material:

| | Grams |
|---|---|
| 1,1,2,3-tetrachlorobutadiene-1,3 | 30 |
| Chloroprene | 171 |
| Dodecyl mercaptan | 0.42 |
| Disproportionated rosin | 6 |
| Sodium sulfite | 0.6 |
| Sodium salt of condensation product of formaldehyde with naphthalene-sulfonic acid | 0.8 |
| Sodium hydroxide | 1.1 |
| Water | 300 |

The emulsion was polymerized at 40° C. from a specific gravity of 1.003 to a specific gravity of 1.063 by the addition of 11 g. of 2% potassium persulfate solution. Polymerization was stopped by the addition of 0.05 g. each of phenothiazine and p-tert-butylcatechol in a toluene-water emulsion. The latex was treated with 50 ml. of 3% ammonia solution and distilled under reduced pressure to remove excess monomers. The polymer was coagulated by adding enough acetic acid to give a pH of 6-7 and 500 ml. of acetone containing 0.5 g. of 2,2′-methylenebis(6-tert-butyl-p-cresol) as stabilizer. The product was leached in acetone, wash-milled with lukewarm water, and milled to dryness with the addition of 1.5 g. of magnesium carbonate. The yield was 125 g. of a soft yellow rubber containing 40.5% chlorine.

The copolymer was compounded with the following recipe:

| | Parts by weight |
|---|---|
| Copolymer | 100 |
| Semireinforcing furnace carbon black | 30 |
| Zinc oxide | 5 |
| Magnesia | 4 |
| 2-mercapto-2-imidazoline | 0.35 |

The compounded stock was cured in a mold in a press at 153° C. for 30 minutes. The tensile properties of the cured product were determined at 25° C. on the Williams tensile machine [see Williams and Sturgis, Ind. Eng. Chem. 31, 1303 (1939)]. The compression set of the cured polymer was determined by A.S.T.M. method D395–55, method B. The hardness was measured on a Shore type A durometer acording to A.S.T.M. method D676–55T. For comparison, a sample of polychloroprene available commercially was compounded and tested in the same way. The properties of the two polymers are shown below:

| | Copolymer | Polychloroprene |
|---|---|---|
| Modulus at 300% elongation, p.s.i. | 1,590 | 1,550 |
| Tensile strength at the break, p.s.i. | 3,330 | 3,340 |
| Elongation at break, p.s.i. | 460 | 460 |
| Compression set, percent | 11 | 10 |
| Hardness, Shore A, Original | 63 | 57 |
| Hardness, Shore A, After 8 days at −20° C | 80 | 90 |
| Wt. percent gain in xylene, 5 days at 25° C | 159 | 174 |

Any of the heretofore-described monomers may be copolymerized with 1,1,2,3-tetrachlorobutadiene-1,3 to give substantially the same results achieved in the preceding specific examples.

As many apparently widely different embodiments of this invention may be made without departing from the spirit and scope thereof, it is to be understood that this invention is not limited to the specific embodiments thereof except as defined in the appended claims.

This application is a continuation-in-part of my earlier-filed U.S. application Serial No. 779,842, filed December 12, 1958, now abandoned.

I claim:
1. Copolymers of 1,1,2,3-tetrachlorobutadiene-1,3 with a copolymerizable monomer containing the terminal grouping $CH_2=C<$.
2. The copolymer of claim 1 wherein the copolymerizable monomer is styrene.
3. The copolymer of claim 1 wherein the copolymerizable monomer is chloroprene.

References Cited in the file of this patent

UNITED STATES PATENTS

| | | |
|---|---|---|
| 1,965,369 | Carothers | July 3, 1934 |
| 2,178,737 | Carothers | Nov. 7, 1939 |
| 2,581,925 | Crane | Jan. 8, 1952 |
| 2,626,964 | Eberly | Jan. 27, 1953 |
| 2,750,431 | Tarrant | June 12, 1956 |
| 2,868,788 | Luvisi | Jan. 13, 1959 |